Aug. 22, 1961     O. H. SCHELDORF     2,997,060

COMPRESSOR INCLUDING IMPROVED DISCHARGE VALVE ARRANGEMENT

Filed July 20, 1959

INVENTOR
OWEN H. SCHELDORF

BY *Walter E. Hule*

HIS ATTORNEY

United States Patent Office 2,997,060
Patented Aug. 22, 1961

2,997,060
COMPRESSOR INCLUDING IMPROVED DISCHARGE VALVE ARRANGEMENT
Owen H. Scheldorf, Fern Creek, Ky., assignor to General Electric Company, a corporation of New York
Filed July 20, 1959, Ser. No. 828,244
5 Claims. (Cl. 137—516.13)

The present invention relates to compressors and is more particularly concerned with compressors including an improved discharge valve arrangement.

High speed compressors such as those employed in the refrigeration industry generally include flexible pressure actuated valves as such valves have been found to be most efficient for high speed operation. Because of their greater resistance to breakage, their ease of manufacture within given tolerances and for a number of additional reasons, such valves frequently consist of flexible, thin discs of metal resiliently supported at their centers on a valve plate with the peripheral edge portion thereof overlying and normally closing one or more gas ports or openings in the plate. In order to provide a backing for the disc valve to limit its flexing movement when in the open position and to anchor the valve in its operative position, a valve backing or retaining member is provided. One type of backing member includes a flat engaging the central portion of the disc valve and a generally spherical or curved annular portion for restricting the lift or opening movement of the unsupported portions of the disc valve in order that the valve will not flex beyond its permissible stress limits. The operating characteristics of such a valve are determined by the unsupported radius of the disc, the greater this unsupported radius the greater the flexibility of the disc and hence the more easily it responds to pressure differentials causing the opening thereof. In order to square the valve backing member with the valve disc and the valve plate against which the disc is secured, it is necessary that the backing member be provided with a flat valve supporting or anchoring center portion of a diameter or area sufficient to assure alignment of the backing member with the other two components. The larger this area the more accurately the backing member can be squared with the remaining components of the valve mechanism. However, for a valve disc of a given overall area, this flat anchoring or squaring area on the valve backing member decreases the unsupported radius of the valve disc and hence the flexibility thereof.

It is a primary object of the present invention to provide a valve arrangement comprising a valve backing member including an adequate flat valve supporting area combined with a valve backing member having an improved valve backing surface designed to provide increased effective valve flexing radius.

Another object of the invention is to provide a valve assembly including a resilient disc valve and a valve backing member, the backing member being designed to reduce valve noises during the operation of the compressor.

Further objects and advantages of the invention will become apparent as the following description proceeds and the features of novelty which characterize the invention will be pointed out with particularity in the claims annexed to and forming part of this specification.

In accomplishing the objects of the present invention, a compressor including a cylinder and a discharge chamber is provided with a discharge valve arrangement comprising a valve plate or member positioned between the cylinder and the discharge chamber, at least one discharge port in the valve member for conducting compressed gas from the cylinder to the discharge chamber and a resilient disc valve arranged so that a peripheral edge portion thereof overlies the outlet end of the port. A valve retaining or backing member having a flat, generally circular surface portion engaging the central portion of the disc valve is suitably secured to the valve member or plate in order to support the disc valve in operative position relative to the port. The valve backing member also includes an annular curved surface which limits the flexing movement of the valve in its open position. This valve backing surface portion of the valve backing member is of a configuration such that during opening of the valve, progressively larger annular areas of the valve can move into supporting engagement with the valve backing member. In order to reduce the valve noise and also to obtain optimum support and flexing of the disc valve, a portion of the curved valve backing surface is flattened along a plane intersecting the flattened or valve anchoring portion of the valve backing member. This flattened area is provided adjacent the outlet end of the discharge port or some of the discharge ports if more than one is provided. Preferably, the discharge conduit for conducting compressed gas from the discharge chamber is disposed substantially in line with the port and flattened area.

For a better understanding of the invention, reference may be had to the accompanying drawing in which.

Figure 1:
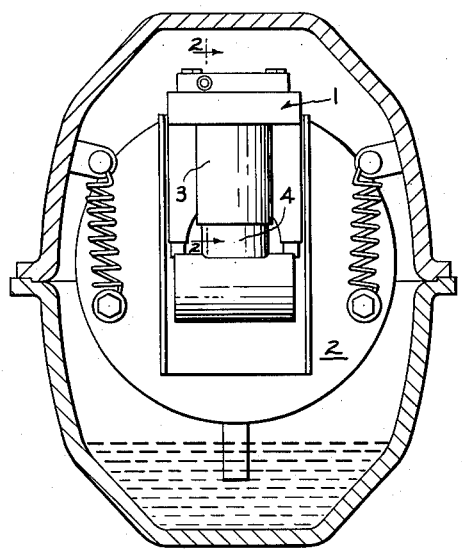
FIG. 1 is an elevation view, partly in section, of a high speed motor driven compressor unit to which the present invention is particularly adapted.
Figure 3:
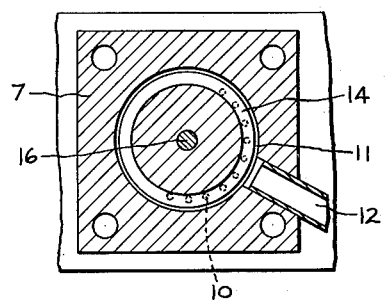
FIG. 3 is a sectional view along line 3—3 of FIG. 2.

With reference to the drawing, there is shown a compressor 1 adapted to be driven by motor 2, the compressor comprising a cylinder 3 and a piston 4 connected to the motor for reciprocal movement of the piston within the cylinder 3. The piston carries an intake valve 5. The compressor cylinder 3 is suitably secured, as by means of welding, to a supporting bracket 6 while a cylinder head 7 is secured to the bracket 6 by means of bolts 8. A valve plate 9, which is positioned between the cylinder 3 and the head 7 and is held in operative position relative to the cylinder by means of the head, contains one or more discharge ports 10 through which gas taken in through inlet valve 5 is exhausted from the cylinder 3 into a discharge chamber 11 provided within the cylinder head 7. From the discharge chamber, the compressed gas is discharged through an exhaust or discharge conduit 12 provided in one of the walls of the cylinder head.

A thin resilient metal valve disc 14 is supported on the upper flat face of the valve plate 9 with the periphery thereof overlying the outlet end of the port or ports 10. For the purpose of securing the disc in this position, there is provided a valve backing and retaining member 15 which in the illustrated modification of the invention is an integral part of the cylinder head 7 and which is fixedly secured to the valve plate 9 by means of a rivet 16 extending through the plate, valve disc and compressor head.

Figure 4:
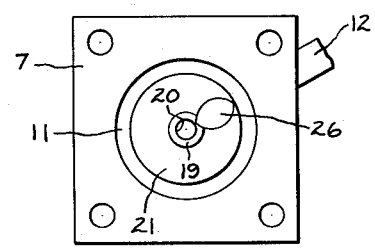
FIG. 4 is a plan view of the cylinder head component of the compressor shown in FIG. 2.
Figure 2:
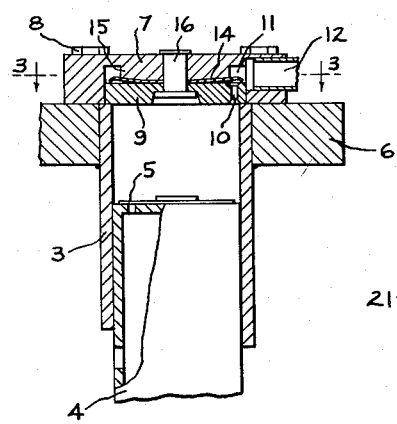
FIG. 2 is a sectional elevation view of the compressor component taken along line 2—2 of FIG. 1.
Figure 5:
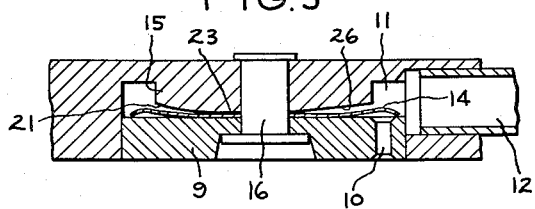
FIG. 5 is an enlarged detailed sectional view of the discharge valve arrangement of the present invention.

As is shown more clearly in FIG. 4 of the drawing, the valve backing member 15 has a central flat surface portion 19 of circular configuration surrounding the rivet hole 20. This flat section primarily provides means for squaring the valve plate, disc valve and valve backing member during assembly so that all of the functional areas of the valve plate and the valve backing member will be properly spaced and positioned relative to one another and to the disc valve 14.

In order to permit the unsupported radius of the disc valve 14 to flex between a valve port closing position and an open position, the valve backing member 15 also includes an annular surface area surrounding the flat area 19 and curving away from the disc 14 to provide a clearance between the peripheral portions of the disc valve and the backing member sufficient to permit the peripheral unsupported portions of the disc valve to move away from the face plate 9 in response to a pressure differential on opposite faces of the disc. The curvature of this annular curved surface portion 21 which for illustration purposes is shown in an exaggerated form in the drawing, desirably approximates the natural curvature of the valve disc 14 when it is in an open position so that as the valve flexes to its discharge or open position, it contacts the backing member over progressively increasing circular areas. To avoid any concentrated stress points in the disc, the transition from the flat circular area 19 to the curved area 21 is gradual or uninterrupted. In other words, it is not abrupt thus avoiding any sharp break at the tangent point, or what may be more specifically termed the tangent circle 23, between the flat surface area 19 and the curved area 21.

Because abrupt changes in the surface of the valve backing member must be avoided in order to prevent breakage of the disc valve under normal operating conditions, it will be seen that particularly with small disc valves it may be quite difficult to maintain the manufacturing and assembly tolerances of the valve parts within limits which will assure an adequate flat center portion 19 on the valve backing member for squaring the valve components and at the same time provide a sufficient free or operating radius of the disc valve to provide a minimum uniform spring constant and hence a high and controlled degree of flexibility of the unsupported portions of the disc valve 14 surrounding the portion thereof clamped by the flat surface 19. In other words, since the transition from flattened area 19 of the valve backing to the curved area 21 is very gradual and the curvature of the cruved area relatively slight, it is difficult to control the actual separation point between the backing member 15 and the adjacent surfaces of the disc 14 to thereby control the valve operating characteristics.

As a means for minimizing or eliminating these problems, the present invention provides the curved valve backing surface with a flattened surface 26 obtained by displacement or removal of material from an area of the curved or radius part of the valve backing member. This flattened portion 26 may be defined as that generated by removal of a segment of this surface along a chord or plane perpendicular to the radius of curvature of the surface 21 and intersecting the flat center area 19 and preferably extending to the edge of the rivet hole 20. It has been found that this flattened portion 26, which provides a local area of greater effective clearance between the adjacent portion of the disc valve and the valve backing member, facilitates an assured flexing and opening of at least this portion of the disc valve in order to provide adequate clearance between the disc valve and the face plate 9 for release of the gas discharged from the cylinder 3 through the ports 10 at a lower pressure differential. Preferably, this flattened area 26 is provided on the valve backing member 15 opposite the exhaust conduit 12 or in other words in the position in which the flattened area 26, at least some of the ports 10, and the exhaust port valve will be substantially in line. By thus positioning the flattened area 26, initial flexing of the disc valve takes place at this point to provide direct flow of the compressed gases from the ports 10 to the exhaust conduit 12.

It will also be seen that by providing this flattened area 26 over only a relatively small portion of the entire curved area contacted by the disc valve when in the open position, the spring constant of the disc valve in this area is held to a minimum with little or no sacrifice of the desired squaring of the valve backing member, the valve disc and the valve plate obtained by means of the flattened area 19. Further, the total effective clamping area obtained by means of the flattened surface area 19 and the exact location of the valve disc separation point or circle about this area become less important since the flattened area 26, which definitely assures flexing of the portion of the disc valve adjacent this area, compensates for the usual manufacturing variations in the rigidly supported center portions of the disc valve. It will also be seen that the lines of intersection of the flattened and curved areas of the backing member provide the desired continually changing point or points of contact between the backing member and the disc valve during opening of the valve. In addition, the flattened surface area 26 also compensates for any variations in flexibility of different portions of the disc valve itself in that the flattened surface 26 which decreases slightly the support provided for the adjacent portion of the disc valve, assures opening or flexing of the valve at this point. Finally, because the flattened area does permit an opening of the valve at lower cylinder pressures, a significant noise reduction can be obtained due to the fact that less compression of the gas within the cylinder 3 is required to move the valve to its open or discharge position.

While there has been shown and described a specific embodiment of the present invention it is to be understood that the invention is not limited to the particular construction shown and it is intended by the appended claims to cover all modifications within the spirit and scope of the invention.

What I claim as new and desire to secure by Letters Patent of the United States is:

1. A valve assembly for compressors and the like comprising a flexible disc valve, and a valve backing member having a central flat surface engaging the center portion of said valve and an outer curved surface area spaced from said valve when said valve is closed and engaged by and supporting said valve disc when said valve is in the open position, said outer surface area being curved over the entire valve contacting area thereof except for a flattened portion generally corresponding to a plane intersecting said central flat surface of said backing member.

2. A valve assembly for compressors and the like comprising a flexible disc valve, and a valve backing member having a central flat surface engaging the center portion of said valve and an outer surface area corresponding to the curvature of said disc valve when flexed to its open position, said outer surface area being spaced from said valve when said valve is closed and being engaged by and supporting said valve when said valve is in the open position, said outer surface area having a flattened portion generally corresponding to a plane intersecting said central flat surface of said backing member.

3. A valve assembly for a compressor comprising a valve member having a face and at least one port therein opening into said face, a circular flexible disc valve disposed on said face with the peripheral edge thereof overlying said port, a valve backing member overlying said disc valve and including a circular flat center portion in contact with the center portion of said disc valve for maintaining said center portion in contact with the center portion of said disc valve for maintaining said center portion thereof in contact with said face and an annular generally curved surface portion spaced from said disc valve when said disc valve is closed and engaged by said disc valve when said disc valve flexes to its open position relative to said port, said curved surface portion being interrupted by a flat area opposite said port, said flat area corresponding to a plane intersecting said flat center portion.

4. A valve assembly for a compressor, comprising, a discharge chamber, a valve member having a face forming the bottom wall of said chamber, said member having at least one port therein opening into said face, an exhaust conduit communicating with said chamber adjacent said port, a circular flexible disc valve disposed on said face with the peripheral edge thereof overlying said port, a valve backing member overlying said disc and including a circular flat center portion in contact with the center portion of said disc valve for maintaining said center portion of said disc valve in contact with said face and an annular generally curved surface portion adapted to be engaged by said disc valve only when it flexes to its open position relative to said port, said curved surface portion being interrupted by a flat area opposite said exhaust conduit, said flat area corresponding to a plane perpendicular to the radius of curvature of said curved surface and intersecting said flat center portion.

5. A valve assembly for a compressor, comprising, a discharge chamber, a valve member having a face forming the bottom wall of said chamber, said member having at least one port therein opening into said face, an exhaust conduit communicating with said chamber adjacent said port, a circular flexible disc valve disposed on said face with the peripheral edge thereof overlying said port, a valve backing member overlying said disc and including a circular flat center portion in contact with the center portion of said disc valve for maintaining said center portion of said disc valve in contact with said face and an annular generally curved surface portion engaged by said disc valve only when it flexes to its open position relative to said port, the curvature of said curved surface portion being substantially the same as the curvature of said disc valve when in its open position, said curved surface portion being interrupted by a flat area in line with said port and said exhaust conduit, said flat area corresponding to a plane perpendicular to the radius of curvature of said curved surface and intersecting said flat center portion.

References Cited in the file of this patent

UNITED STATES PATENTS 2,249,480     Leegard _____ July 15, 1941

FOREIGN PATENTS 472,033     Italy _____ June 4, 1952